(12) United States Patent
Doong et al.

(10) Patent No.: US 8,388,732 B2
(45) Date of Patent: Mar. 5, 2013

(54) INTEGRATED MEMBRANE AND ADSORPTION SYSTEM FOR CARBON DIOXIDE REMOVAL FROM NATURAL GAS

(75) Inventors: Shain-Jer Doong, Kildeer, IL (US); Lubo Zhou, Inverness, IL (US); Dennis J. Bellville, Deer Park, IL (US); Mark E. Schott, Palatine, IL (US); Leonid Bresler, Northbrook, IL (US); John M. Foresman, Homer Glen, IL (US)

(73) Assignee: UOP LLC, Des Plaines, IL (US)

( * ) Notice: Subject to any disclaimer, the term of this patent is extended or adjusted under 35 U.S.C. 154(b) by 19 days.

(21) Appl. No.: 13/105,462

(22) Filed: May 11, 2011

(65) Prior Publication Data

US 2011/0315010 A1    Dec. 29, 2011

Related U.S. Application Data

(60) Provisional application No. 61/358,433, filed on Jun. 25, 2010.

(51) Int. Cl.
 *B01D 53/22* (2006.01)
(52) U.S. Cl. ............ 95/45; 95/49; 95/51; 95/90; 95/114
(58) Field of Classification Search ............... 95/45, 49, 95/51, 90, 114
See application file for complete search history.

(56) References Cited

U.S. PATENT DOCUMENTS

| | | | |
|---|---|---|---|
| 5,332,424 A * | 7/1994 | Rao et al. ......................... 95/47 |
| 5,411,721 A * | 5/1995 | Doshi et al. .................... 423/220 |
| 5,486,227 A | 1/1996 | Kumar et al. |
| 5,753,011 A * | 5/1998 | Sircar et al. .......................... 95/45 |
| 5,846,295 A | 12/1998 | Kalbassi et al. |
| 6,425,267 B1 * | 7/2002 | Baker et al. ...................... 62/624 |
| 7,025,803 B2 * | 4/2006 | Wascheck et al. ................. 95/50 |
| 7,047,764 B2 | 5/2006 | Sawchuk et al. |
| 7,074,322 B2 | 7/2006 | Sawchuk et al. |
| 7,114,351 B2 | 10/2006 | Jones, Jr. et al. |
| 7,131,272 B2 | 11/2006 | Jones, Jr. et al. |
| 7,231,784 B2 | 6/2007 | Howard et al. |
| 7,243,510 B2 | 7/2007 | Jones, Jr. et al. |
| 7,251,956 B2 | 8/2007 | Sawchuk et al. |
| 7,314,503 B2 | 1/2008 | Landrum et al. |
| 7,322,387 B2 | 1/2008 | Landry et al. |
| 7,396,388 B2 * | 7/2008 | Mitariten .......................... 95/123 |
| 7,429,287 B2 | 9/2008 | Frantz |
| 7,500,370 B2 | 3/2009 | Coward |
| 7,537,641 B2 | 5/2009 | Lokhandwala et al. |
| 7,591,149 B2 | 9/2009 | Ransbarger et al. |
| 7,600,395 B2 | 10/2009 | Eaton et al. |

(Continued)

FOREIGN PATENT DOCUMENTS

| | | |
|---|---|---|
| EP | 1226860 A1 | 7/2002 |
| EP | 1710008 A1 | 10/2006 |

(Continued)

*Primary Examiner* — Jason M Greene
*Assistant Examiner* — Anthony Shumate
(74) *Attorney, Agent, or Firm* — Mark Goldberg

(57) ABSTRACT

The present invention relates to an integrated membrane/adsorbent process and system for removal of carbon dioxide from natural gas on a ship that houses natural gas purification equipment. Additional membrane units or adsorbent beds are used to reduce the amount of product gas that is lost in gas streams that are used to regenerate the adsorbent beds. These systems produce a product stream that meets the specifications of less than 50 parts per million carbon dioxide in natural gas for liquefaction.

9 Claims, 2 Drawing Sheets

U.S. PATENT DOCUMENTS

| | | |
|---|---|---|
| 7,637,984 B2 * | 12/2009 | Adamopoulos .................. 95/45 |
| 7,678,349 B2 | 3/2010 | Sawchuk et al. |
| 8,192,524 B2 * | 6/2012 | Chinn et al. ..................... 95/51 |
| 2007/0006732 A1 * | 1/2007 | Mitariten ........................ 95/237 |
| 2007/0240449 A1 | 10/2007 | Howard et al. |
| 2008/0127655 A1 | 6/2008 | Landry et al. |
| 2009/0013697 A1 | 1/2009 | Landry et al. |
| 2009/0205365 A1 | 8/2009 | Van Aken et al. |
| 2011/0185896 A1 * | 8/2011 | Sethna et al. .................... 95/45 |
| 2011/0290111 A1 * | 12/2011 | Dunne et al. ..................... 95/51 |
| 2012/0085232 A1 * | 4/2012 | Sethna et al. .................... 95/41 |

FOREIGN PATENT DOCUMENTS

| | | |
|---|---|---|
| EP | 1762294 A2 | 3/2007 |
| WO | 2008116864 A1 | 10/2008 |
| WO | 2009087155 A1 | 7/2009 |
| WO | 2009087156 A1 | 7/2009 |
| WO | 2009124372 A2 | 10/2009 |

\* cited by examiner

INTEGRATED MEMBRANE AND ADSORPTION SYSTEM FOR CARBON DIOXIDE REMOVAL FROM NATURAL GAS

CROSS-REFERENCE TO RELATED APPLICATION

This application claims priority from Provisional Application No. 61/358,433 filed Jun. 25, 2010, the contents of which are hereby incorporated by reference.

BACKGROUND OF THE INVENTION

This invention relates to a process and system for removing carbon dioxide from natural gas in a floating environment, such as on a ship. More specifically, the invention relates to an integrated membrane/adsorbent system for removal of carbon dioxide from natural gas on a ship that houses natural gas purification equipment.

In an LNG (Liquefied Natural Gas) plant, carbon dioxide content in the feed gas stream must be reduced to less than 50 ppmv before liquefaction to avoid formation of dry ice within the system. Commercially this can be achieved by using a solvent absorption process such as contacting the natural gas with an amine solvent to remove the carbon dioxide, which is then followed with the natural gas being sent through a molecular sieve dehydration unit to remove water down to below 1 ppmv.

Depending on the amount of carbon dioxide and the volume in the inlet gas stream, membrane processes have also been used to remove the bulk of the carbon dioxide in front of a downstream amine unit. One of the benefits of this membrane-amine hybrid system is the reduction of the size of amine column that is needed and as well as a reduction in its energy consumption. Adsorption systems have also been used for front-end feed purification for LNG plants. TSA (Temperature Swing Adsorption) processes employing molecular sieves such as 4A or 13X zeolites can remove both carbon dioxide and water from natural gas streams. A growing application for a TSA process is for peak shaving of pipeline gas, where a portion of the pipeline gas is converted and stored as an LNG when demand is low. In the TSA process, the adsorbed carbon dioxide and water in the molecular sieve column are regenerated using a hot purge gas, typically from the feed or the product gas stream. The hot regeneration gas is cooled to knock out most of the water and is then returned to the pipeline. The carbon dioxide removed from the adsorbent, which is not condensable at the cooler temperature, is also returned to the pipeline.

There has been a renewed interest in floating liquefied natural gas (FLNG) systems as a way to develop stranded gas fields, isolated and remote from land. These fields generally are too small for permanent platform installation. An FLNG system will use a ship or barge to house necessary recovery, gas treatment, liquefaction and offloading equipment. Compared to a land based LNG plant, an FLNG system will have a greater need for a modular design to minimize the equipment footprint and weight. An additional challenge for FLNG systems is the effect of sea motion on the performance of processing equipment, especially for systems containing liquid. The removal of carbon dioxide by use of an amine system can be impacted by a loss of efficiency from rocking and tilting of the column internal components. While both membrane and TSA systems have been used commercially in offshore platform installation, nearly no operating experiences for amine systems have been reported for offshore platform applications.

In general, membrane processes that use carbon dioxide-selective polymers such as cellulose acetate can not generate a residue or product stream that meets the specification levels of less than 50 ppmv $CO_2$, as the process is limited by the driving force or the $CO_2$ partial pressure across the membrane. Molecular sieve TSA processes typically can not handle a feed stream with more than 3% $CO_2$, since the size of the adsorbent beds that is required become too large and the necessary regeneration gas flow then becomes prohibitively large. Furthermore, for an FLNG application, there is no existing solution to treat or recycle the effluent regeneration gas, which contains the $CO_2$ removed from the feed stream.

There exists a need to develop an improved process or integrated processes that can remove carbon dioxide and moisture to meet FLNG requirements. The desired processes should be compact and robust, and not susceptible to producing natural gas that is below specification due to winds and waves.

SUMMARY OF THE INVENTION

The present invention provides a process of treating a natural gas stream comprising sending a natural gas stream to a ship, barge or platform that is carrying equipment for purification of natural gas. The natural gas stream is sent to a membrane unit on the ship, barge or platform to remove carbon dioxide and other impurities from the natural gas stream and to produce a partially purified natural gas stream. Then, the partially purified natural gas stream to a temperature swing adsorption unit to remove carbon dioxide and produce a purified natural gas stream, and sending a regeneration gas stream to the temperature swing adsorption unit to desorb carbon dioxide from adsorbents within the temperature swing adsorption unit. The regeneration gas is then preferably subjected to additional treatment by an additional membrane unit or an additional adsorbent bed to remove the carbon dioxide and to recover natural gas from the regeneration stream to be included in the product stream. The regeneration gas may be returned to the same temperature swing adsorption unit or to a second temperature adsorption unit for additional treatment.

DETAILED DESCRIPTION OF THE INVENTION

In this invention, membrane and adsorption processes are combined to remove $CO_2$ from a natural gas stream to below 50 ppm. The inlet gas stream is first processed by a membrane unit to lower the $CO_2$ level to below about 3%. The product gas or the residue gas from the membrane is sent to a molecular sieve TSA unit to further reduce the $CO_2$ to below 50 ppmv. In most embodiments of the invention, regeneration gas from the TSA unit, which contains the non-condensable $CO_2$ is recycled back to the inlet of the membrane or further processed by a combination of membrane and TSA units. The invention is particularly useful for offshore application such as FLNG and operates without the use of a solvent absorption system such as an amine solvent.

The prior art practice for the front-end purification of an LNG or FLNG plant to remove $CO_2$ and water. The membrane section may not be needed, especially if the $CO_2$ content in the feed is low. The TSA regeneration gas generally can be recycled to the feed of the TSA because water is removed from a knock out after cooling the regeneration gas.

Figure 1:
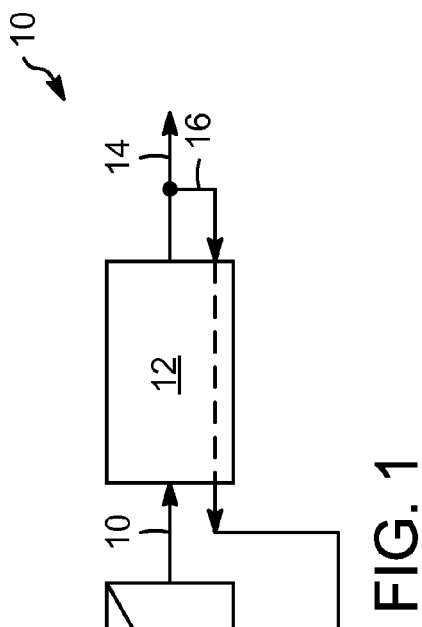
FIG. 1 shows an integrated membrane/adsorbent bed system for purifying natural gas.

FIG. 1 shows one embodiment of the present invention, where a membrane unit first treats the feed gas to lower the $CO_2$ level to below about 3%, and preferably below about 2%. The resulting partially purified natural gas feed stream is then cooled to about 45° C., preferably to about 35° C., more preferably to about 24° C. and even more preferably cooled to below about 5° C. This is followed by sending the gas to a molecular sieve TSA unit to further reduce the $CO_2$ level to below 50 ppmv. The regeneration gas from the TSA unit, which contains the non-condensable $CO_2$ is recycled back to the inlet of the membrane. The membrane can be of a single stage or multi-stage for increasing hydrocarbon recovery. More specifically, in FIG. 1, a feed 2 is shown entering a membrane unit 4, with carbon dioxide being removed in a permeate stream 8 and the treated natural gas going to a TSA unit 12 in line 10. The natural gas is further treated with carbon dioxide levels being reduced below 50 ppm by TSA and the fully treated natural gas is now sent to a liquefier in line 14. A small portion of the fully treated natural gas is shown sent back to the TSA unit as a regeneration stream 16 to remove the adsorbed carbon dioxide from the adsorbent and returned to feed 2 so that the majority of this carbon dioxide may be removed by the membrane unit.

Figure 2:
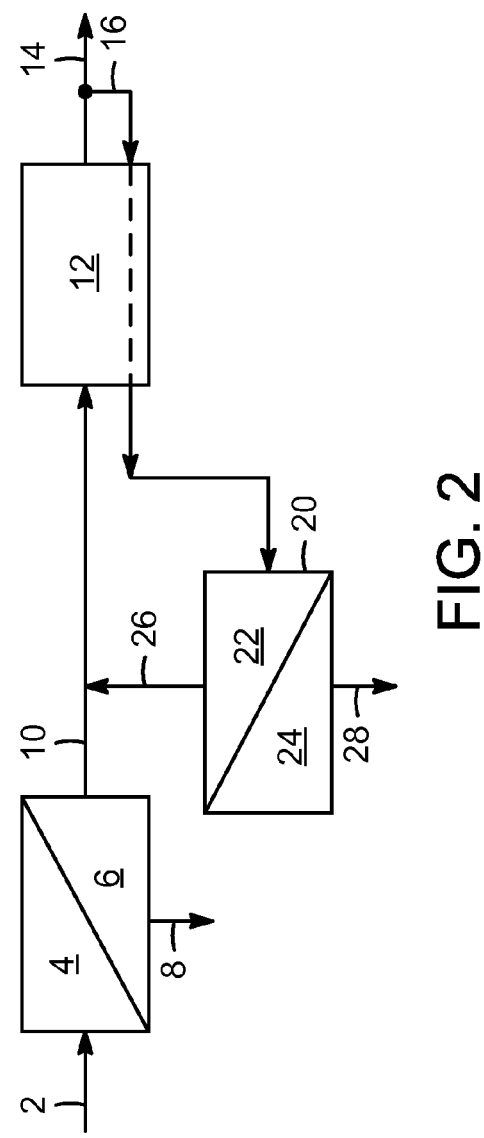
FIG. 2 shows an integrated membrane/adsorbent bed system for purifying natural gas with a membrane unit to purify the regeneration stream.

FIG. 2 is another embodiment of the present invention. Referring back to the first embodiment in FIG. 1, the regeneration effluent stream 16 from the TSA unit may contain, on average, 2 to 5% of $CO_2$, which is mixed with the inlet feed stream before the membrane unit. The feed stream can contain higher than 5% $CO_2$, more typically higher than 10% $CO_2$ and sometimes much higher amounts of carbon dioxide. Mixing of these two streams with disparate $CO_2$ concentrations may result in an inefficiency of separation. Therefore, in the second embodiment of this invention, a separate membrane unit is used to treat the TSA regeneration gas. This second membrane unit removes a certain amount of $CO_2$ from the regeneration gas and generates a residue gas that has the same $CO_2$ composition as the residue gas from the first membrane unit. The residue gases from both membrane units are sent to the TSA. More specifically, in FIG. 2 is seen a feed 2 is shown entering a membrane unit 4, with carbon dioxide being removed in a permeate stream 8 and the treated natural gas going to a TSA unit 12 in line 10. The resulting partially purified natural gas feed stream is then preferably cooled to about 24° C. and more preferably cooled to below about 5° C. The natural gas is further treated with carbon dioxide levels being reduced below 50 ppm by TSA and the fully treated natural gas is now sent to a liquefier in line 14. A small portion of the fully treated natural gas is shown sent back to the TSA unit as a regeneration stream 16 to remove the adsorbed carbon dioxide from the adsorbent and then sent to a second membrane unit 24 to remove carbon dioxide in line 28 and then return the treated regeneration stream in line 26 to line 10.

Figure 3:
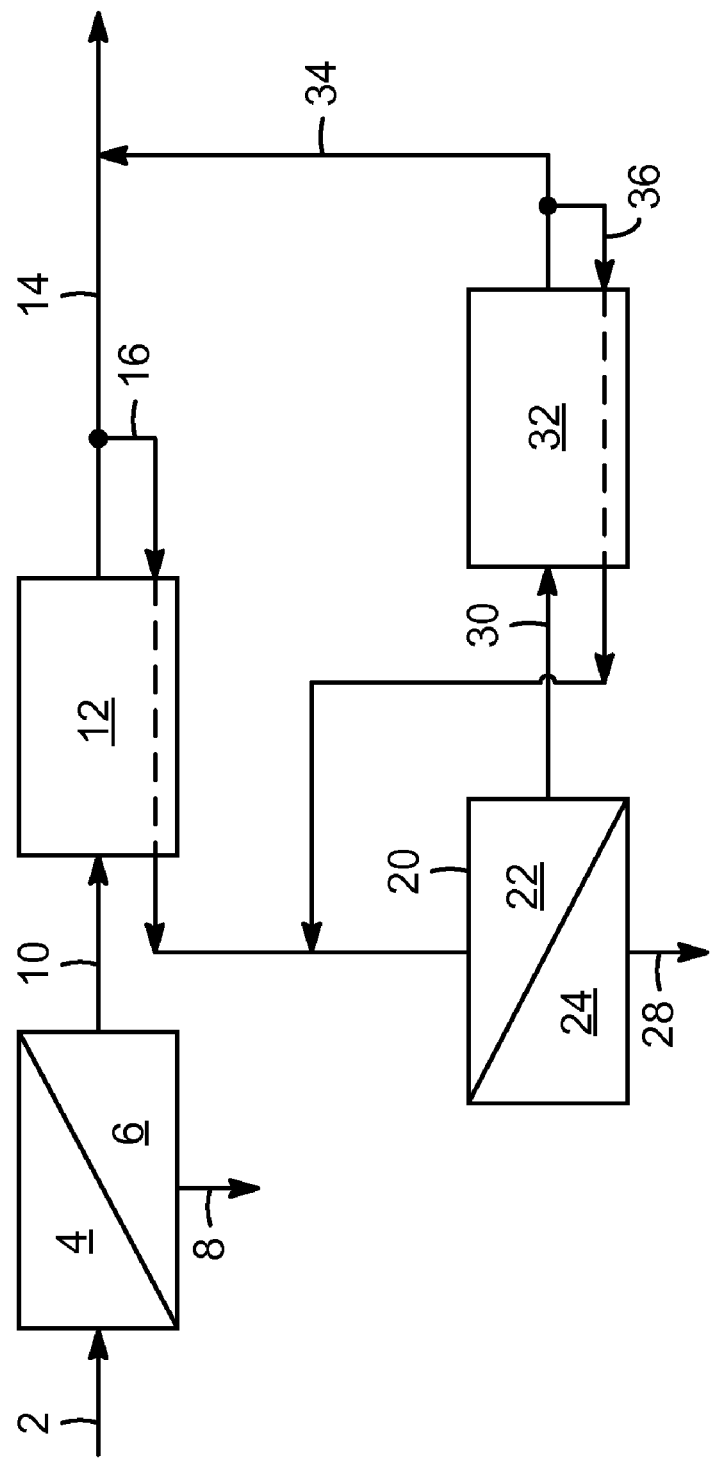
FIG. 3 shows an integrated membrane/adsorbent bed system for purifying natural gas with a membrane unit and an adsorbent bed to purify the regeneration stream.

Without mixing of the two gas streams with disparate $CO_2$ concentrations, the combined size of the two membrane units is expected to be smaller than one single membrane unit as in FIG. 1 of the first embodiment. However, the TSA size can still remain quite large if the feed stream to the TSA contains high concentration of $CO_2$, e.g. greater than 1%. This can be improved by the third embodiment of this invention as shown in FIG. 3, where the residue gas from the second membrane unit is kept at a low $CO_2$ composition, e.g. about 0.5%, before it is sent to a second TSA unit. As the feed to this second TSA unit contains only about 0.5% of $CO_2$, the TSA size and its associated regeneration gas can be reduced significantly. This regeneration gas is recycled back to the inlet of the second membrane unit. The size of the first TSA unit can also be reduced as its regeneration gas is no longer recycled to its feed as in the embodiment of FIG. 2. More specifically in FIG. 3 is shown a feed 2 entering a membrane unit 4, with carbon dioxide being removed in a permeate stream 8 and the treated natural gas going to a TSA unit 12 in line 10. The resulting partially purified natural gas feed stream is then preferably cooled to about 24° C. and more preferably cooled to below about 5° C. The natural gas is further treated with carbon dioxide levels being reduced below 50 ppm by TSA and the fully treated natural gas is now sent to a liquefier in line 14. A small portion of the fully treated natural gas is shown sent back to the TSA unit as a regeneration stream 16 to remove the adsorbed carbon dioxide from the adsorbent and then sent to a second membrane unit 24 to remove carbon dioxide in line 28, go to a second TSA unit 32 to remove carbon dioxide through line 30 and then return the treated regeneration stream in line 34 to line 14. A regeneration stream 36, which is a portion of the treated regeneration stream 34, is shown passing through second TSA unit 32 to remove carbon dioxide from the adsorbent with the TSA unit 32 and then to return to line 16 before it enters second membrane unit 24.

In summary, the features of the current invention are that the system is not susceptible to vibration or rocking from sea motion due to absence of liquid solvent amine unit. In addition to $CO_2$, water can be removed by the membrane unit and the molecular sieve TSA unit. Both the membrane and the TSA units are integrated by further processing the regeneration gas from the TSA unit using a second membrane unit or a combination of a second membrane and a second TSA unit.

Membrane materials that can be used for $CO_2/CH_4$ separation include cellulose acetate, polyimide, perfluoro polymer, etc. Adsorbents that can be used for the $CO_2$ removal in the TSA process include zeolite A, X or Y with different levels of Si/Al ratios and with various cationic forms such as Na, Ca, Li, K, Ba, Sr, etc. The current invention is not limited to the materials used for the membrane or the adsorption process.

The following examples demonstrate various applications of the current invention.

EXAMPLE 1

A natural gas stream with a $CO_2$ composition of 20%, a flow rate of 5,663,000 m³/day (200 MMSCFD) at 5171 kPa (750 psia) and 24° C. (75° F.) is to be converted to LNG. Based on the first embodiment of the current invention in FIG. 2, the gas first enters into a membrane unit to remove the bulk of $CO_2$ and the membrane residue gas is then sent to a molecular sieve TSA unit to remove $CO_2$ down to 50 ppm level. The regeneration off-gas from the TSA unit is recycled back to the feed of the membrane unit. The permeate gas from the membrane is burned as a fuel. The required membrane and TSA sizes and the flow rates are summarized in Table 1 for four different cases of 0.5, 1, 2 and 3% of $CO_2$ compositions in the membrane residue stream or the feed to the TSA unit. The results are all referenced to the case with 0.5% $CO_2$, where the calculated flow rates and equipment sizes are scaled to 100 for this case. Also included in the table are the recoveries of $CH_4$ from the integrated process and the relative total equipment weight and footprint. As can be seen, increasing the $CO_2$ concentration for the feed to the TSA increases the size or the sorbent volume and the regeneration gas flow of the TSA unit. However, the size of the membrane unit decreases. Overall, decreasing the $CO_2$ concentration of the TSA feed reduces the total equipment weight, but the minimum footprint appears at about 1% $CO_2$. The methane recovery increases with the increasing $CO_2$ concentration for the membrane residue gas or the feed to the TSA unit.

TABLE 1

Simulation Results from Example 1

| Feed to TSA, $CO_2$ % | 0.5% | 1% | 2% | 3% |
|---|---|---|---|---|
| relative flow to TSA | 100 | 141 | 222 | 374 |
| relative reg flow of TSA | 100 | 214 | 556 | 1305 |
| number of TSA beds | 3 | 4 | 12 | 20 |
| relative sorbent volume | 100 | 243 | 631 | 1433 |
| relative membrane size | 100 | 75 | 62 | 63 |
| relative flow to membrane | 100 | 110 | 141 | 207 |
| $C_1$ recovery | 100 | 123 | 137 | 137 |
| relative total equipment wt. | 100 | 123 | 246 | 588 |
| relative total footprint | 100 | 94 | 147 | 244 |

EXAMPLE 2

The example is based on the first embodiment of the current invention and the same conditions as in Example 1 except that the feed temperature of the gas entering the TSA unit is cooled down to 1.7° C. (35° F.). As the treated gas from the TSA unit will be sent to a downstream liquefaction plant, cooling the gas to 1.7° C. (35° F.) is not expected to incur energy penalty. The results are summarized in Table 2, expressed in terms of relative values to the case of 0.5% $CO_2$ in Table 1 of Example 1. Lowering feed temperature to the TSA unit not only reduces the TSA size, but also reduces its regeneration flow. Consequently, the membrane sizes are also reduced. Total equipment weight and footprint are all lower than those of Table 1.

TABLE 2

Simulation Results from Example 2

| Feed to TSA, $CO_2$ % | 0.5% | 1% | 2% | 3% |
|---|---|---|---|---|
| relative flow to TSA | 98 | 135 | 199 | 294 |
| relative reg flow of TSA | 83 | 175 | 427 | 876 |
| number of TSA beds | 3 | 3 | 8 | 16 |
| relative sorbent volume | 77 | 161 | 485 | 999 |
| relative membrane size | 99 | 73 | 58 | 55 |
| relative flow to membrane | 98 | 107 | 129 | 169 |
| $C_1$ recovery | 101 | 126 | 141 | 145 |
| relative total equipment wt. | 94 | 99 | 191 | 351 |
| relative total footprint | 98 | 85 | 116 | 185 |

EXAMPLE 3

The example is also based on the first embodiment of the current invention and the same conditions as in Example 1 except that a two-stage membrane is used instead of a single stage membrane. The results are listed in Table 3, again expressed in terms of relative values to the case of 0.5% $CO_2$ in Table 1 of Example 1. In addition to the increasing sizes of the membrane units, the sizes of the TSA units are also increased due to the higher $CH_4$ recoveries and higher membrane residue gas flows into the TSA unit. As expected, the overall equipment weight or footprint is more than that of Example 1.

TABLE 3

Simulation Results from Example 3

| Feed to TSA, $CO_2$ % | 0.5% | 1% | 2% | 3% |
|---|---|---|---|---|
| relative flow to TSA | 197 | 228 | 321 | 533 |
| relative reg flow of TSA | 197 | 342 | 804 | 1854 |
| number of TSA beds | 4 | 8 | 12 | 20 |
| relative sorbent volume | 218 | 372 | 900 | 1997 |
| relative membrane size | 201 | 128 | 97 | 98 |
| relative flow to membrane | 195 | 177 | 203 | 296 |
| $C_1$ recovery | 197 | 199 | 198 | 195 |
| relative total equipment wt. | 214 | 227 | 346 | 639 |
| relative total footprint | 222 | 185 | 213 | 337 |

EXAMPLE 4

The feed gas conditions are the same as Example 1, but one additional membrane unit is added to process the TSA regeneration effluent gas, following the second embodiment of the current invention in FIG. 2. This second membrane generates a residue gas with the same $CO_2$ concentration as the residue gas from the first membrane unit. The two membrane residue gases are combined, cooled to 1.7° C. (35° F.) and sent to the TSA unit. The results in terms of relative numbers are shown in Table 4. Compared with Table 2 of Example 2, the overall membrane sizes are deceased because the regeneration off-gas from the TSA unit, with average $CO_2$ compositions ranging from 2.7 to 4.9%, is sent to the second membrane unit, which avoids the inefficiency of mixing with a high $CO_2$ composition of 20% in the feed. The improved separation efficiency of the membrane unit also increases the $C_1$ recovery, in comparison with Example 2. However, the increased membrane residue gas flow also increases the feed to the TSA unit, and increases its size. Consequently, only a small reduction in overall equipment weight or footprint is achieved in this example.

TABLE 4

Simulation Results from Example 4

| Feed to TSA, $CO_2$ % | 0.5% | 1% | 2% | 3% |
|---|---|---|---|---|
| relative flow to TSA | 101 | 139 | 208 | 314 |
| relative reg flow of TSA | 92 | 180 | 447 | 939 |
| number of TSA beds | 3 | 3 | 8 | 16 |
| relative sorbent volume | 80 | 166 | 508 | 1067 |
| relative total membrane size | 94 | 69 | 51 | 46 |
| relative membrane size (M2) | 5 | 7 | 9 | 11 |
| feed to Mem. (M2), $CO_2$ % | 2.7 | 3.8 | 4.6 | 4.9 |
| $C_1$ recovery | 105 | 129 | 148 | 156 |
| relative total equipment wt. | 92 | 98 | 192 | 359 |
| relative total footprint | 95 | 83 | 113 | 183 |

EXAMPLE 5

The example is also based on the second embodiment of the current invention, but with a two-stage membrane for the first membrane as in the Example 3 and a single stage membrane for the second membrane. The relative results are summarized in Table 5. In comparison with the results in Table 3, the sizes of both the membrane and the TSA units are reduced and the overall equipment weight or footprint is also decreased. Because the permeate from the second membrane is not recovered by a second stage membrane, the $C_1$ recovery is lower than in Example 3. Consequently, the TSA sizes are reduced due to the decreased feed flows to the TSA units.

A variation of this example is to use a two-stage membrane for the second membrane and a single-stage membrane for the first membrane. The choice depends on the quality and quantity of the permeate gas, which typically can be used as a fuel source.

TABLE 5

Simulation Results from Example 5

| Feed to TSA, $CO_2$ % | 0.5% | 1% | 2% | 3% |
|---|---|---|---|---|
| relative flow to TSA | 188 | 216 | 303 | 503 |
| relative reg flow of TSA | 188 | 326 | 759 | 1753 |
| number of TSA beds | 4 | 8 | 12 | 20 |
| relative sorbent volume | 209 | 372 | 851 | 1921 |
| relative total membrane size | 180 | 109 | 74 | 68 |
| relative membrane size (M2) | 9 | 10 | 13 | 16 |
| feed to Mem. (M2), $CO_2$ % | 2.4 | 3.2 | 3.9 | 4.2 |
| $C_1$ recovery | 188 | 189 | 187 | 184 |
| relative total equipment wt. | 185 | 201 | 309 | 595 |
| relative total footprint | 180 | 152 | 178 | 290 |

EXAMPLE 6

This example is based on the third embodiment of the current invention in FIG. 3. The example is the same as Example 4, but one additional TSA unit is used to process the residue gas from the second membrane unit, which is kept at a $CO_2$ composition of 0.5%. The relative results are presented in Table 6, where the case for the 0.5% $CO_2$ to the first TSA unit is omitted because the results are the same as in Table 4 of Example 4. As can be seen in Table 6, the sizes of the membrane units are increased because more $CO_2$ is removed to reach a residue gas composition of 0.5% for the second membrane. On the other hand, the overall TSA sizes are reduced, mainly due to the reduced $CO_2$ feed composition to the second TSA unit. This effect is more pronounced for the two cases with 2 and 3% $CO_2$ to the first TSA unit, which results in a significant reduction of overall equipment weight or footprint. The increased size of the second membrane unit also contributes to the reduction of $C_1$ recovery, compared to Table 4.

TABLE 6

Simulation Results from Example 6

| Feed to TSA, $CO_2$ % | 1% | 2% | 3% |
|---|---|---|---|
| relative flow to TSA1 | 109 | 128 | 137 |
| relative reg flow of TSA1 | 136 | 261 | 390 |
| relative flow to TSA2 | 24 | 44 | 61 |
| relative reg flow of TSA2 | 26 | 47 | 51 |
| number of beds, TSA1 | 3 | 4 | 6 |
| number of beds, TSA2 | 2 | 2 | 3 |
| relative total sorbent volume | 152 | 350 | 414 |
| relative total membrane size | 73 | 66 | 70 |
| relative membrane size (M2) | 11 | 24 | 37 |
| feed to Mem. (M2), $CO_2$ % | 3.5 | 4.2 | 4.7 |

TABLE 6-continued

Simulation Results from Example 6

| Feed to TSA, $CO_2$ % | 1% | 2% | 3% |
|---|---|---|---|
| $C_1$ recovery | 125 | 134 | 131 |
| relative total equipment wt. | 105 | 152 | 187 |
| relative total footprint | 93 | 104 | 131 |

The invention claimed is:

1. A process of treating a natural gas stream comprising:
    a) sending said natural gas stream to a ship, barge or platform;
    b) then sending said natural gas stream to a membrane unit on said ship, barge or platform to remove carbon dioxide and other impurities from said natural gas stream to produce a partially purified natural gas stream;
    c) then sending said partially purified natural gas stream to a temperature swing adsorption unit to remove carbon dioxide and produce a purified natural gas stream; and
    d) sending a regeneration gas stream to said temperature swing adsorption unit to desorb carbon dioxide from adsorbents within said temperature swing adsorption unit wherein after said regeneration gas stream passes through said temperature swing adsorption unit, said regeneration gas stream is combined with said natural gas stream.

2. The process of claim 1 wherein said regeneration gas stream is a portion of said purified natural gas stream.

3. The process of claim 1 wherein said regeneration gas stream is sent to a second membrane unit to remove carbon dioxide from said regeneration gas stream.

4. The process of claim 3 wherein after passing through said second membrane unit, said regeneration gas stream is sent to a second temperature swing adsorption unit to remove a further amount of carbon dioxide.

5. The process of claim 3 wherein after said regeneration gas stream passes through said second membrane unit, said regeneration gas stream is sent back through said temperature swing adsorption unit.

6. The process of claim 1 wherein said partially purified natural gas stream is cooled to a temperature below about 45° C. before being sent to said temperature swing adsorption unit.

7. The process of claim 1 wherein said partially purified natural gas stream is cooled to a temperature below about 35° C. before being sent to said temperature swing adsorption unit.

8. The process of claim 1 wherein said partially purified natural gas stream is cooled to a temperature below about 24° C. before being sent to said temperature swing adsorption unit.

9. The process of claim 1 wherein said partially purified natural gas stream is cooled to a temperature below about 5° C. before being sent to said temperature swing adsorption unit.

* * * * *